D. D. SMITH.
Improvement in Dumping-Wagons.
No. 130,950.  Patented Aug. 27, 1872.
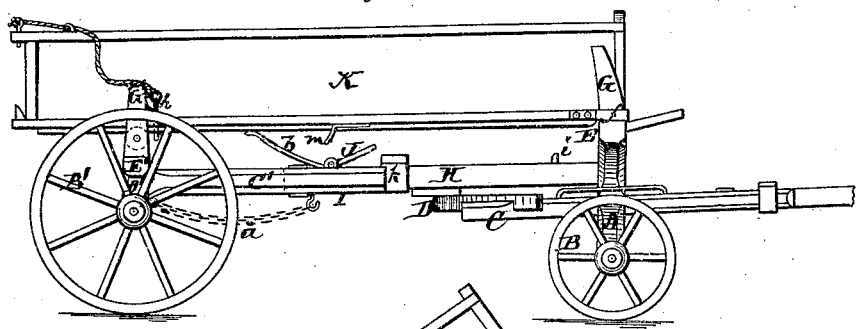
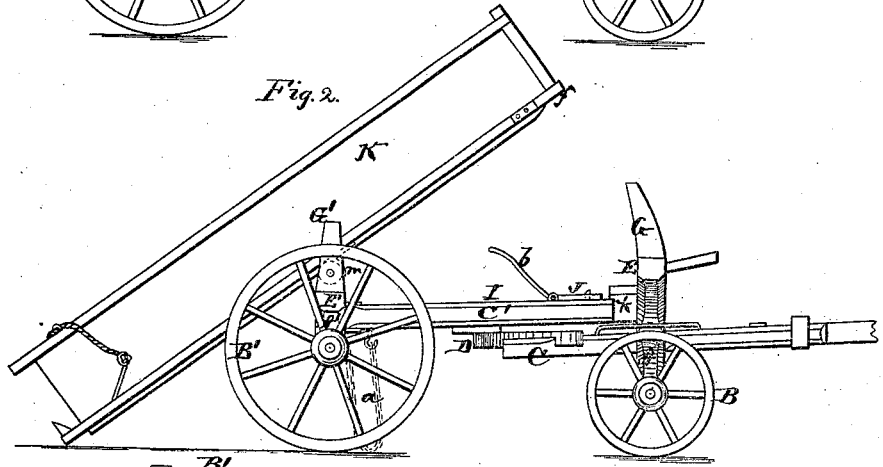
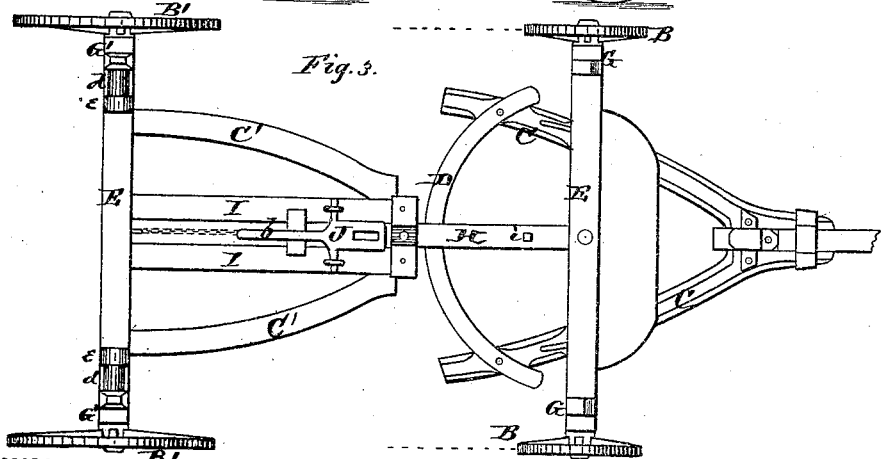
Witnesses:
Henry N. Miller
C. L. Evert
Inventor
Dan'l D. Smith
per Alexander Mason
Attorneys.

UNITED STATES PATENT OFFICE.

DANIEL D. SMITH, OF LOUISVILLE, KENTUCKY, ASSIGNOR OF ONE-HALF HIS RIGHT TO MILLER & GOULDING, OF SAME PLACE.

IMPROVEMENT IN DUMPING-WAGONS.

Specification forming part of Letters Patent No. 130,950, dated August 27, 1872.

*To all whom it may concern:*

Be it known that I, DANIEL D. SMITH, of Louisville, in the county of Jefferson and in the State of Kentucky, have invented certain new and useful Improvements in Dumping-Wagons; and do hereby declare that the following is a full, clear, and exact description thereof, reference being had to the accompanying drawing and to the letters of reference marked thereon making a part of this specification.

The nature of my invention consists: First, in a sliding coupling, by which the bed is run back over the hind axle until it can be dumped, the wagon closing together so as to run the bed over the hind axle; second, in the application of rollers under the bed on the hind axle, by which the bed can be run back over the axle as the wagon closes together; and, third, in a trip-catch, by which the wagon is held together after it is backed and dumped, until the wagon is drawn away from the load, but which is loosened when the bed falls, and thus allows the wagon to draw out to its natural position.

In order to enable others skilled in the art to which my invention appertains to make and use the same, I will now proceed to describe its construction and operation, referring to the annexed drawing, in which—

Figure 1 is a side elevation, showing the wagon drawn out. Fig. 2 is a similar view, showing the wagon closed; and Fig. 3 is a plan view of the running gear of the wagon.

A represents the front axle with the wheels B B. C C are the front hounds with the circle or part of circle D. E is the front bolster with the standards G G, one near each end. A' is the rear axle; B' B', the rear wheels; C' C', the rear hounds; E', the rear bolster, with the standards G' G'. All these parts are constructed and arranged in the manner usual for the running-gear of a wagon. H represents the coupling bar or reach, which connects the front and rear axles. The front end of this coupling passes into a mortise in the front bolster E, and is fastened by the usual king-bolt passing through the same. The rear end of the coupling H passes between two parallel bars, I I, connecting the front ends of the hind hounds C' C' with the rear axle A' and bolster E', and the coupling is connected with the hind axle by a chain, $a$, as shown. On the bars I I is pivoted a latch, J, which, at its rear end, is provided with a curved arm, $b$, as shown. This latch or trip-catch is to fall over and catch on a pin, $i$, fastened in the upper side of the coupling H, near the front end. On the hind bolster E, a suitable distance inward from each standard G', is an ear, $e$, between which and the standard is mounted a roller, $d$. The wagon-bed K rests at its rear end on these rollers $d\ d$, while the front end rests on the front bolster E, loops $ff$, attached one on each side of the bed at the front end, passing over the front standards G G, thus holding the bed in position. A pin, $h$, is passed through the edge of the bottom of the bed on each side, immediately in front of the rollers $d\ d$, to prevent the wagon from closing in backing up.

When the wagon has been backed up to the place where it is desired to unload the same, the pins $h\ h$ are taken out and the team backed still further, when the front part of the running-gear will close up onto the hind part, the coupling-bar H sliding between the bars I I, and held straight between them by a metal band, $k$, surrounding their front ends. In the act of thus closing together, the front standards G G push the bed K by means of the loops $ff$ toward the rear, the bed moving easily over the rollers $d\ d$. At the time when the wagon completes its closing movement curved pieces, $m$, on the under side of the bed, come in contact with and embrace the front sides of the rollers $d\ d$, thus forming suitable bearings upon which the bed may turn to be dumped. As the bed is dumped, the latch J falls down and catches on the pin $i$, so that in moving the wagon forward from the load the parts will remain in the same position. Then, by throwing the bed down horizontally again, the bed will strike the arm $b$, and raise the latch so as to allow the wagon to extend the full length of the chain $a$, when the team is started.

Having thus fully described my invention, what I claim as new, and desire to secure by Letters Patent, is—

The combination of the bed K with curved pieces m m, the rollers d d, sliding coupling H, latch J with arm b, and the pin i, all constructed and arranged substantially as and for the purposes herein set forth.

In testimony that I claim the foregoing I have hereunto set my hand this 6th day of July, 1872.

DANIEL D. SMITH.

Witnesses:
M. W. LA RUE,
O. S. WEST.